US011999072B2

(12) United States Patent
Scimone et al.

(10) Patent No.: US 11,999,072 B2
(45) **Date of Patent: *Jun. 4, 2024**

(54) COMPACT SAFETY CUTTER

(71) Applicant: SLICE, INC., Sunny Isles, FL (US)

(72) Inventors: Thomas Scimone, Sunny Isles Beach, FL (US); Scot Herbst, Santa Cruz, CA (US); Robert Joseph Gallegos, Fremont, CA (US)

(73) Assignee: Slice, Inc., Sunny Isles, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/516,538

(22) Filed: Nov. 1, 2021

(65) Prior Publication Data

US 2022/0048212 A1 Feb. 17, 2022

Related U.S. Application Data

(63) Continuation of application No. 16/776,949, filed on Jan. 30, 2020, now Pat. No. 11,161,265.

(51) Int. Cl.
*B26B 29/02* (2006.01)

(52) U.S. Cl.
CPC .................................... *B26B 29/02* (2013.01)

(58) Field of Classification Search
None
See application file for complete search history.

(56) References Cited

U.S. PATENT DOCUMENTS

| | | | | |
|---|---|---|---|---|
| 2,644,230 | A * | 7/1953 | Anderson | B26B 29/02 30/2 |
| 6,718,637 | B1 * | 4/2004 | Ortner | B26B 29/02 30/294 |
| 8,732,956 | B2 * | 5/2014 | McGushion | B26B 29/02 30/2 |
| 9,676,107 | B2 * | 6/2017 | Garavaglia | B26B 29/02 |
| 10,300,615 | B2 * | 5/2019 | Votolato | B26B 3/08 |
| 11,161,265 | B2 * | 11/2021 | Scimone | B26B 5/005 |
| 2006/0048389 | A1 * | 3/2006 | Votolato | B26B 29/02 30/2 |
| 2009/0151168 | A1 * | 6/2009 | Dadam | B26B 5/001 30/162 |
| 2011/0252648 | A1 * | 10/2011 | Votolato | B26B 29/02 30/151 |
| 2022/0048212 | A1 * | 2/2022 | Scimone | B26B 5/005 |

* cited by examiner

*Primary Examiner* — Hwei-Siu C Payer
(74) *Attorney, Agent, or Firm* — McCarter & English, LLP; James M. Smedley; Alex Korona

(57) ABSTRACT

The present invention generally relates to a safety cutter. Specifically, embodiments of the present invention relate to a compact safety cutter apparatus with a retractable blade guard. Embodiments of the safety cutter apparatus are further comprised of an automatic blade guard release mechanism.

20 Claims, 4 Drawing Sheets

COMPACT SAFETY CUTTER

CROSS-REFERENCE TO RELATED APPLICATIONS

This application is a continuation of U.S. patent application Ser. No. 16/776,949 filed on Jan. 30, 2020, now U.S. Pat. No. 11,161,265, and entitled COMPACT SAFETY CUTTER, which is hereby incorporated by reference in its entirety.

FIELD OF THE INVENTION

The present invention generally relates to a safety cutter. Specifically, embodiments of the present invention relate to a compact safety cutter apparatus with a retractable blade guard. Embodiments of the safety cutter apparatus are further comprised of an automatic blade guard release mechanism.

BACKGROUND

Typically, carton cutters are cutting tools with a folding or otherwise retractable blade. Prior developed carton cutters require a user to unfold the blade from the handle or extend the blade with a button or other mechanism in order to lock the blade into place before use. This design feature increases the probability of injury, as the blade is left unnecessarily exposed for extended periods of time because many users do not securely retract the blade when the carton cutter is used repeatedly in a short period of time.

For example, currently available carton cutters require a user to wrap their hand completely around the handle or shaft of the carton cutter. This design creates a hazard, as the user may be exposed to the sharp blade of the cutter if the cutter accidentally slips through the user's hand. Moreover, current carton cutter blades are configured to lock in an extended position, wherein the blade is exposed, increasing the threat posed by such cutting tools.

Furthermore, current carton cutters are difficult to utilize while wearing gloves, and pose particular difficulties to users having limited grip strength.

Therefore, there is a need in the art for a carton cutter that incorporates an automatic blade guarding mechanism and improved handle ergonomics. These and other features and advantages of the present invention will be explained and will become obvious to one skilled in the art through the summary of the invention that follows.

SUMMARY OF THE INVENTION

Accordingly, it is an aspect of the present invention to provide a cutting device with an automatic blade guarding mechanism. Furthermore, it is an aspect of the present invention to provide a compact tool with an ergonomic and safe handle to make precise cuts.

According to an embodiment of the present invention, a compact safety cutter includes: a main body housing comprising a front-half body shell, a rear-half body shell, a blade, and a blade guard outlet slot, wherein the blade guard outlet slot is formed at a bottom region of the main body housing from an opening formed between the front-half body shell and the rear-half body shell, a blade guard retained within the main body housing and configured to extend from the opening at the bottom region of the main body housing, a tension component comprising a spring member, wherein the tension component exerts a spring force on the guard to extend the guard past the blade guard outlet slot, and a guard release switch configured to pass through a switch slot at a side region of the main body housing, the guard release switch having a spring-like member and at least one connector post to engage with the blade guard, the blade guard configured to align with a blade guard track to form a blade guard control unit that is movable between at least a first, second and third position, wherein in the first position, the guard release switch and the blade guard extend outwards of the blade guard outlet slot, wherein in the second position, the guard release switch is compressed and the blade guard is retractable into the main body housing via the blade guard outlet slot, and wherein in the third position, the guard release switch is compressed and the blade guard is retracted into the main body housing via the blade guard outlet slot.

According to an embodiment of the present invention, the front-half and rear-half body shell further include a release slot formed as an aperture in an outer wall of the front-half and rear-half body shell in which the guard release switch moves between the first position and the second position.

According to an embodiment of the present invention, the guard release switch comprises a blade guard connector post configured to engage with the blade guard in a manner that facilitates the movement of the blade guard from the first position to the second position.

According to an embodiment of the present invention, the main body housing further includes an engagement means that is adapted to align and engage the front-half body section to the rear-half body section about their respective edges.

According to an embodiment of the present invention, the blade guard is configured to be manually retractable when the guard release switch is in the second position.

According to an embodiment of the present invention, the at least two positions correspond to at least two blade guard positions selected from a group of blade guard positions comprising a fully extended blade guard, a partially extended blade guard, and fully retracted blade guard.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

Figure 1:
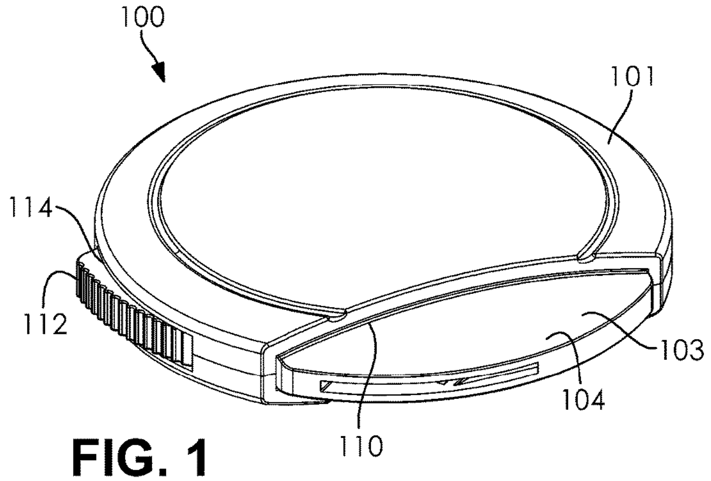
FIG. 1 shows a front perspective view of a safety cutter with an extended blade guard in accordance with an embodiment of the present invention.

The present invention generally relates to a safety cutter. Specifically, embodiments of the present invention relate to a compact safety cutter apparatus with a retractable blade guard. Embodiments of the safety cutter apparatus are further comprised of an automatic blade guard mechanism.

According to an embodiment of the present invention, the safety cutter comprises a main body housing, a blade, a blade guard, a blade guard release switch, and a blade outlet slot. Certain embodiments of the present invention may include fewer components or additional components depending on the utilization and purpose for the safety cutter.

According to an embodiment of the present invention, the main body housing of the safety cutter is configured to receive and retain the blade guard, the guard release switch, the blade, and the tension component. In some embodiments, the main body housing may be comprised of two corresponding halves, a front-half body shell and a rear-half body shell, that are configured to contain the other components of the safety cutter. In some embodiments, the main body housing is substantially round and is configured to permit deft movement while cutting. In some embodiments, the main body housing may comprise housing engagement members configured to align and connect the front-half body shell with the rear-half body shell. In some embodiments, the main body housing may comprise a blade guard outlet slot formed at a bottom edge of the main body housing. In some embodiments, the blade guard outlet slot is formed from an opening between the front-half body shell and the rear-half body shell. In some embodiments, the main body housing may include a chain receiving hole at the top edge of the safety cutter, for example, a hole configured to receive a keychain or lanyard. In some embodiments, the main body housing may be substantially circular in shape. One of ordinary skill in the art would appreciate that the main body housing could be designed in any number of configurations, and embodiments of the present invention are contemplated for use with any such configuration.

According to an embodiment of the present invention, the main body housing of the safety cutter comprises a front-half body shell. In some embodiments, the front-half body shell comprises a blade guard outlet slot and a blade guard track. In some embodiments, the blade guard outlet slot may be an indentation formed at a bottom edge of the front-half body shell that receives at least a portion of the blade guard and creates a passage to the internal portion of the safety cutter. In some embodiments, the blade guard track defines a path for the movement of the blade guard within the main body housing. One of ordinary skill in the art would appreciate that are numerous suitable configurations for the front-half body shell of the safety cutter, and embodiments of the present invention are contemplated for use with any such configuration.

According to an embodiment of the present invention, the main body housing of the safety cutter comprises a rear-half body shell. In some embodiments, the rear-half body shell comprises a blade guard outlet slot and a blade guard track. In some embodiments, the blade guard outlet slot is an indentation formed at a bottom edge of the rear-half body shell that receives at least a portion of the blade guard and creates a passage to the internal portion of the safety cutter. In some embodiments, the blade guard track defines a path for the movement of the blade guard within the main body housing. One of ordinary skill in the art would appreciate that are numerous suitable configurations for the rear-half body shell of the safety cutter, and embodiments of the present invention are contemplated for use with any such configuration.

According to an embodiment of the present invention, the main body housing includes a front housing engagement means and a rear housing engagement means. In some embodiments, the front housing engagement means comprises one or more connector elements configured along the edge of the front-half body shell and corresponding connector elements on the rear-half body shell, that are adapted to connect and align the front-half body shell to the rear-half body shell. One of ordinary skill in the art would appreciate that the each of the housing engagement could be adapted with a number of designs, and embodiments of the present invention are contemplated for use with any suitable design.

According to an embodiment of the present invention, the main body housing comprises a blade guard outlet slot. In some embodiments, the blade guard outlet slot is formed on the edge of the bottom portion of the main body housing. In particular, an indentation in the edges of each of the front-half body shell and rear-half body shell collectively form the blade guard outlet slot when the two halves are connected together. One of ordinary skill in the art would appreciate that the blade guard outlet slot could be adapted with a number of designs, and embodiments of the present invention are contemplated for use with any suitable design.

According to an embodiment of the present invention, the safety cutter may include a blade guard. In some embodiments, the blade guard is configured to move forward and backward within the main body housing. In some embodiments, the blade guard includes a blade channel and a blade opening. In some embodiments, the blade channel is configured to retain a blade. In some embodiments, the blade guard is configured to extend and retract, while the blade maintains a static position relative to the main body housing. In some embodiments, the blade channel is generally wider than the blade, permitting the movement of the blade guard without necessitating movement of the blade. In some embodiments, the blade guard is engaged with a guard release switch. In some embodiments, the guard release switch is configured to regulate the retraction and extension of the blade guard. In some embodiments, the blade guard includes a guard column. In some embodiments, when the guard release switch is in its first position, the substantially horizontal connector post of the guard release switch blocks the substantially vertical guard column from moving upwards into the main body housing, thereby preventing the retraction of the blade guard. When the guard release switch is moved to its second position, the connector post moves, permitting the upwards movement of the guard column and blade guard into the main body housing, thereby allowing the blade guard to retract into the main body housing. In some embodiments, the tension component disposed between the blade guard and the inner edge of the main body housing exerts a spring force on the blade guard and prevents the blade guard from freely retracting into the main body housing when the guard release switch is compressed.

In some embodiments, when the guard release switch is in its second position and a force (greater than the spring force) is exerted on the blade guard, the blade guard retracts into the main body housing. One of ordinary skill in the art would appreciate that there are many suitable designs for a blade guard, and embodiments of the present invention are contemplated for use with any such design.

According to an embodiment of the present invention, the main body housing comprises a guard release switch. In some embodiments, the guard release switch comprises a spring-like member, a connector post having a post opening and a post blocker component, and an actuator component. In some embodiments, the top of the actuator component may be grooved to improve grip between the guard release switch and the thumb of a user. In some examples, when the actuator component of the blade guard release switch is pressed, the blade guard is retractable into the main body housing. In some embodiments, the guard release switch may connect with the blade guard, the blade guard configured to engage with the blade guard track in a manner that allows the blade guard to be aligned to slide forward and backward within the main body housing. In some embodiments, the spring-like member may be a lever arm. In an exemplary usage scenario, when the guard release switch is moved from its first position to its second position, for example, when the guard release switch is compressed, the spring-like member is configured to compress to move the connector post such that the post opening aligns with the guard column of the blade guard, permitting the guard column to pass through the connector post, thereby permitting the blade guard to retract upwards into the main body housing. Thus, a force greater than the spring force applied by the tension component may be applied to the blade guard, and the blade guard may retract, when the connecter post is not preventing its progression into the main body housing. Moreover, when the extension force applied by the tension component is greater than the external force applied to the blade guard, the blade guard is configured to automatically extend. In some embodiments, the guard release switch may be released to move the connector post back to blocking the path of the guard column, to re-lock the blade guard in the extended position. One of ordinary skill in the art would appreciate that there are many suitable designs for a blade guard release switch, and embodiments of the present invention are contemplated for use with any such design.

According to an embodiment of the present invention, the main body housing may comprise a tension component. In some embodiments, the tension component, for example, a spring, is disposed between the blade guard and the internal edge of the main body housing. When the guard release switch is in the first position (i.e. not pushed or compressed), the tension component is configured to bias the blade guard to extend out of the blade guard outlet slot. Consequently, the tension component, having an elastic potential energy greater than zero, applies a pushing force on the blade guard, seeking to push the blade guard out of the main body housing. However, when the guard release switch is in its first position, the connector post extending from the guard release switch is configured to block the blade guard column and prevent the blade guard from retracting into the main body housing. In some examples, when the guard release switch and, consequently, the connector post extending therefrom, are moved from the first position to the second position, for example, as a result of a compression force applied to the guard release switch, the connector post is moved to permit the blade guard to pass through the post opening, thereby permitting the retraction of the blade guard into the main body housing. Thus, if a force greater than the spring force applied by the tension component is applied to the blade guard, the blade guard is configured to retract, now that the connecter post is not preventing its progression into the main body housing. Moreover, if a force is not applied to the outside of the blade guard (or the force applied to the blade guard is lower than the spring force applied by the tension component), the tension component is configured to cause the blade guard to automatically extend to cover the blade. One of ordinary skill in the art would appreciate that there are many suitable designs for a tension component, and embodiments of the present invention are contemplated for use with any such design.

According to an embodiment of the present invention, a blade is disposed within the safety cutter. In some embodiments, the blade may be removably engaged with a blade carrier. In some embodiments, the blade carrier is disposed within the blade channel in the blade guard. In some embodiments, the blade may be elongated and have a first end portion and a second end portion. In some embodiments, the first end portion of the blade is selectively disposed nearest the blade opening. In some embodiments, the second end portion of the blade is selectively disposed nearest the blade opening. The blade may be made from any suitable material, including, but not limited to, metal, ceramic, or any combination thereof. One of ordinary skill in the art would appreciate that there are numerous configurations and materials that might be used for the blade, and embodiments of the present invention are contemplated for use with any such material or configuration.

According to an embodiment of the present invention, the main body housing includes a drawer opening configured to receive a blade carrier. In some embodiments, the blade carrier is configured to retain the blade of the safety cutter. In some embodiments, the blade carrier is configured as a drawer which is adapted to slide along a blade track in the blade channel of the blade guard. Exterior to the drawer opening, along the edge of the main body housing may be disposed a blade carrier lock comprising a lock nob. In some embodiments, the blade carrier lock may be configured to lock the blade carrier in place within the main body housing. In some embodiments, the lock nob is configured to slide between a first and second position. In some embodiments, the first position is the position in which the lock nob substantially covers a top portion of the blade carrier and the second position is the position in which the lock nob is removed from atop the blade carrier, to permit its removal from within the main body housing. Consequently, the drawer opening is configured to be in a “closed” or “locked” position when the lock nob is in the first position and in an “open” or “unlocked” position when the lock nob is in the second position. In some embodiments, along the track of the blade carrier is a spring-like mechanism. In some embodiments, the spring-like mechanism is configured to push at least a portion of the blade carrier out of the main body housing when the spring-like mechanism is activated. In an exemplary usage scenario, a first blade may be replaced by a second blade by unlocking the blade lock, pressing the top of the blade carrier so that at least a portion of the blade carrier exits the main body housing, disengaging the first blade from the blade carrier and engaging the second blade with the blade carrier. One of ordinary skill in the art would appreciate that the blade carrier could be adapted with a number of designs, and embodiments of the present invention are contemplated for use with any suitable design.

According to an embodiment of the present invention, the blade that is used may be constructed from a ceramic material that is capable of withstanding extended use without becoming dull or unusable. Ceramic materials appropriate for such construction include, but are not limited to, Zirconium Oxide. One of ordinary skill in the art would appreciate that there are numerous ceramic materials that could be utilized with embodiments of the present invention.

According to an embodiment of the present invention, the main body housing may include a chain receiving hole at the top edge of the safety cutter. The chain receiving hole may be, for example, a hole configured to receive a keychain or lanyard. In some embodiments, the chain receiving hole is formed on the edge of the rear portion of the main body housing. In some embodiments, one or more notches in the edges of each of the front-half body shell and rear-half body shell collectively form the chain receiving hole when the two halves are connected together. One of ordinary skill in the art would appreciate that there are many suitable designs for a chain receiving hole and embodiments of the present invention are contemplated for use with any such design.

According to an embodiment of the present invention, the blades used in the pocket cutter may contain rounded tips to reduce the chance of injury.

Turning now to FIG. 1, a front perspective view of a safety cutter, in accordance with an embodiment of the present invention, is shown. In the depicted embodiment, the safety cutter 100 comprises a substantially round main body housing 101, a blade (not shown), a blade guard 103, and a guard release switch 112. In some embodiments the blade guard 103 includes an outer blade guard component 104 and an inner blade guard component (not shown). In this view, the guard release switch 112 can be seen resting in the switch slot 114 and the blade guard 103 can be seen resting in the blade guard outlet slot 110.

Figure 2:
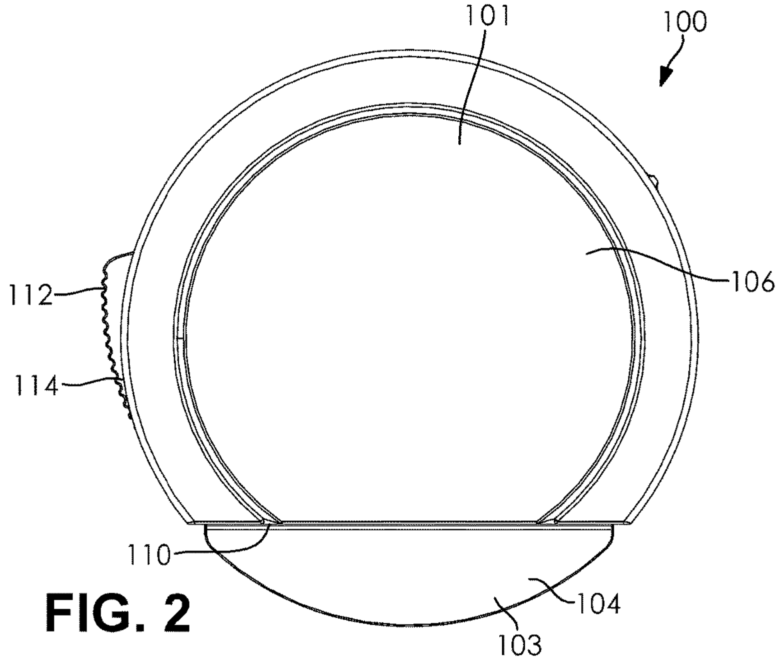
FIG. 2 shows a top view of a safety cutter with an extended blade guard in accordance with an embodiment of the present invention.

Turning now to FIG. 2, a top view of a safety cutter, in accordance with an embodiment of the present invention, is shown. In the depicted embodiment, the safety cutter 100 comprises a main body housing 101, an blade guard component 103, a blade guard outlet slot 110, a guard release switch 112, and a blade (not shown). In this view, the guard release switch 112 can be seen in an extended position in the switch slot 114 that is located between the front-half body shell 106 and the rear-half body shell (not shown). In the depicted embodiment, the blade guard outlet slot 110 is formed on the edge of the bottom portion of the main body housing 101. In the illustrated example, an indentation in the edges of each of the front-half body shell 106 and rear-half body shell (not shown) collectively form the blade guard outlet slot 110 when the two halves are connected together. In the depicted example, the outer blade guard component 104 extends past the blade guard outlet slot 110.

Figure 3:
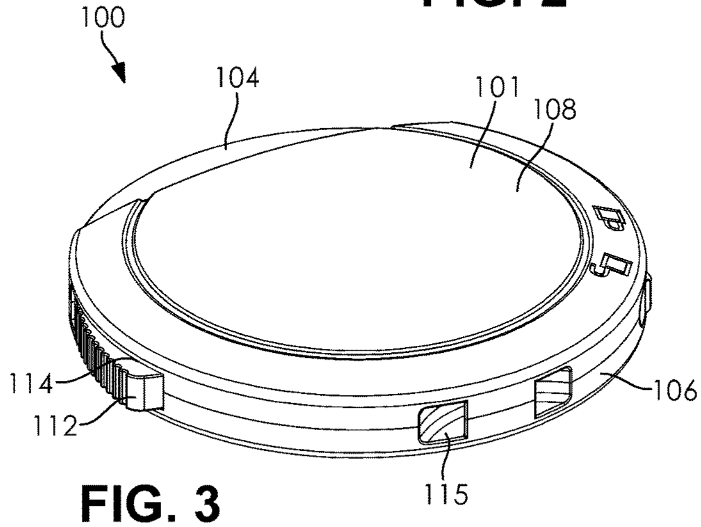
FIG. 3 shows a rear perspective view of a safety cutter with an extended blade guard in accordance with an embodiment of the present invention.

Turning now to FIG. 3, a rear perspective view of a safety cutter, in accordance with an embodiment of the present invention, is shown. In the depicted embodiment, the safety cutter 100 comprises a main body housing 101, a guard release switch 112, and a blade (not shown). In this view, the guard release switch 112 can be seen in an extended position in the switch slot 114 that is located between the front-half body shell 106 and the rear-half body shell 108. In the illustrated example, the tension component (not shown) biases the outer blade guard component 104 towards the extended guard position. In the depicted example, notches in the edges of each of the front-half body 106 shell and rear-half body shell 108 collectively form a chain receiving channel 115 when the two halves are connected together.

Figure 4:
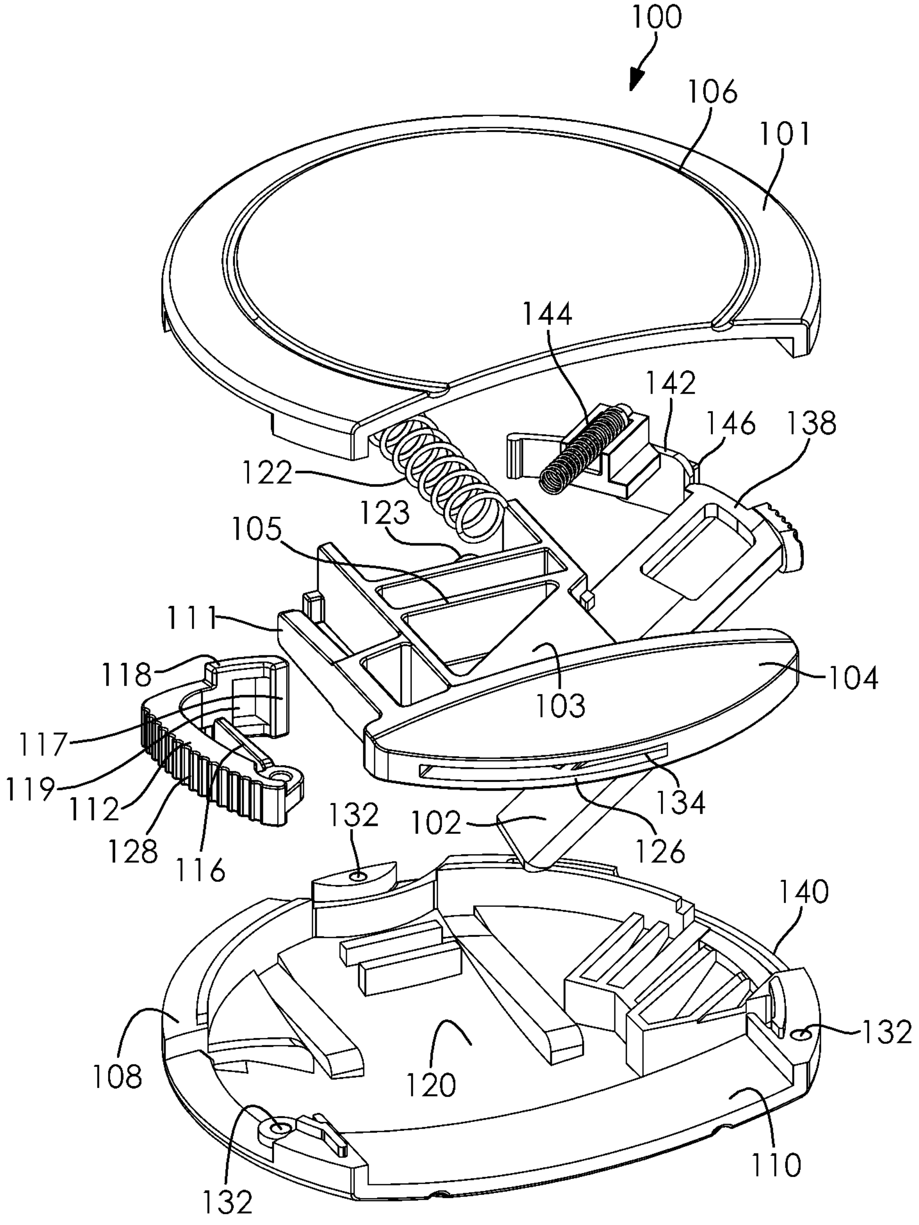
FIG. 4 shows a front exploded perspective view safety cutter in accordance with an embodiment of the present invention.

Turning now to FIG. 4, a front exploded perspective view of a safety cutter, in accordance with an embodiment of the present invention, is shown. In the depicted embodiment, the main components that comprise the safety cutter 100 are a main body housing 101, a blade 102, blade guard 103, and a guard release switch 112 configured with a spring-like member 116 and one or more connector posts 118. In the illustrated embodiment, the blade guard 103 comprises an outer blade guard component 104 and an inner blade guard component 105 and is configured to move forward and backward within the main body housing 101. In the depicted embodiment, the blade guard 103 includes a guard column 111, and a blade opening 126 extending towards a blade channel 134. In some embodiments, the blade guard 103 includes one or more guard columns 111. In the illustrated example, the blade channel 134 is configured to retain the blade 102. In the depicted embodiment, the blade guard 103 is configured to move forward and backward, while the blade 102 maintains a substantially static position relative to the main body housing 101. In the illustrated example, the blade channel 134 is generally wider than the blade 102, permitting the movement of the blade guard 103 without necessitating movement of the blade 102. In the depicted example, the blade guard 103 is engaged with the guard release switch 112. In the illustrated example, the guard release switch 112 is configured to regulate the retraction and extension of the blade guard 103. In the depicted embodiment the connector post 118 is substantially horizontal and the guard column 111 is substantially vertical. In the illustrated example, when the guard release switch 112 is in its first position, the connector post 118 of the guard release switch 112 blocks the guard column 111 from moving upwards into the main body housing 101, thereby preventing the retraction of the blade guard 103 into the main body housing 101. In some examples, when the guard release switch 112 is moved to its second position, the connector post 118 moves, permitting the upwards movement of the guard column 111 and blade guard 103 upwards into the main body housing 101, thereby permitting the blade guard 103, and specifically, the outer blade guard component 104, to retract into the main body housing 101. In some embodiments, the tension component 122 disposed between the inner blade guard component 105 and the interior edge of the main body housing 101 exerts a spring force on the blade guard 103 to bias the blade guard 103, and specifically, the outer blade guard component 104, to its extended position when the guard release switch 112 is compressed. In the depicted example, the inner blade guard component 105 includes a stability component 123 (also shown in FIG. 5) configured to stabilize the position of the tension component 122 within the main body housing 101. In some embodiments, when the guard release switch 112 is in its second position and a force (greater than the spring force) is exerted on the blade guard 103 to push the blade guard 103 into the main body housing 101, the blade guard 103 retracts into the main body housing 101 to expose the blade 102.

In some embodiments, the guard release switch 112 engages with the blade guard 103 to permit the extension and retraction of the blade guard 103. In some embodiments, the guard release switch 112 engages with the blade guard 103 such that when the guard release switch 112 is compressed, the connector post 118 no longer blocks the guard column 111, permitting the blade guard 103 to move upwards into the main body housing 101. In some embodiments, when the guard release switch 112 is either in its extended or compressed positions, the tension component 122 biases the blade guard 103 to remain in its extended position and substantially prevents the blade guard 103 from freely retracting into the main body housing 101. In some embodiments, pressing or applying pressure to a bottom portion of the blade guard 103 to overcome the spring force exerted by the tension component 122 causes the outer blade guard component 104 to retract into the main body housing 101, thereby exposing the blade 102 extending from the blade opening 126. Moreover, removing the pressure or pushing force on the blade guard 103 permits the tension component 122 to bias the blade guard 103 back to the extended position such that the outer blade guard component 104 extends to cover the blade 102. In some embodiments, the blade guard 103 may be re-locked in its extended position when the guard release switch 112 is released.

Figure 5:
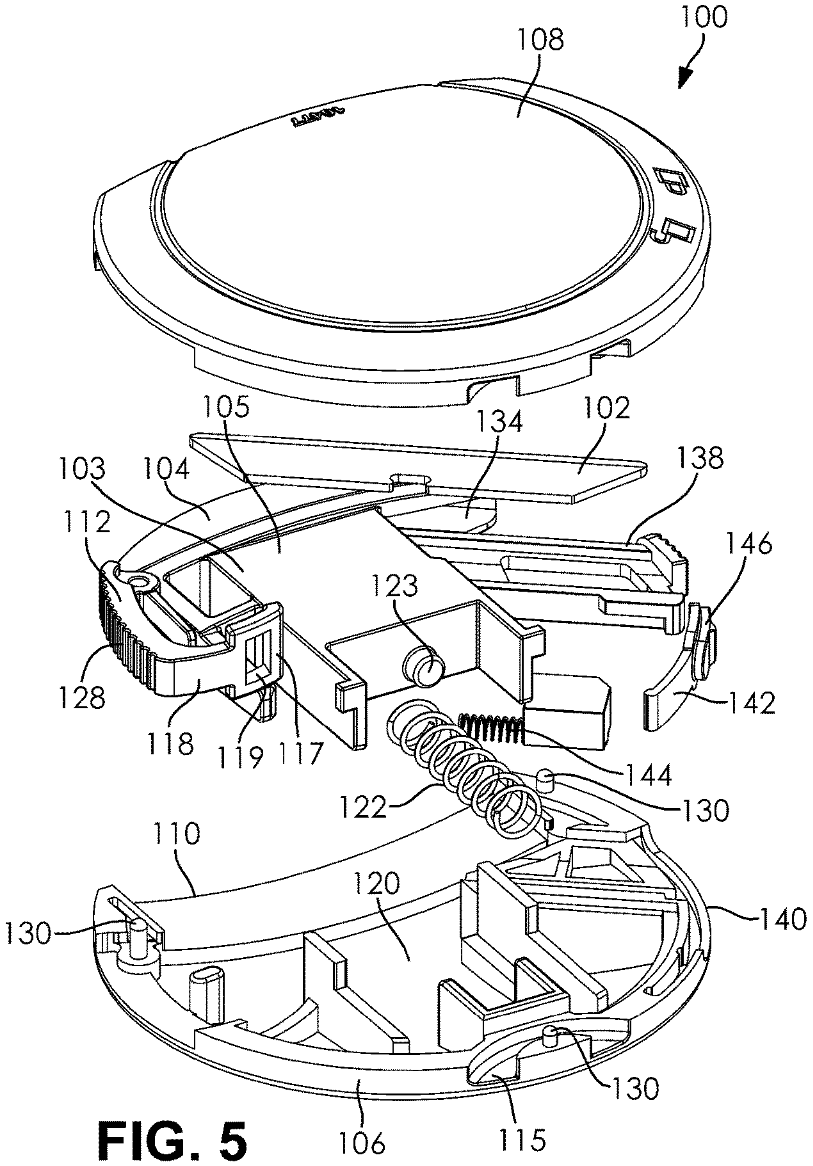
FIG. 5 shows a rear exploded perspective view safety cutter in accordance with an embodiment of the present invention.
Figure 6:
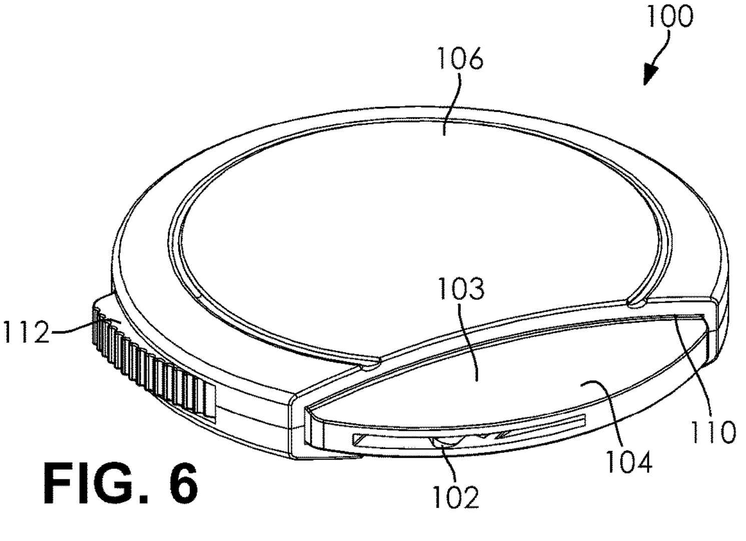
FIG. 6 shows a front perspective view of a safety cutter with an extended blade guard in accordance with an embodiment of the present invention.

Turning now to FIG. 5, a rear exploded perspective view of a safety cutter, in accordance with an embodiment of the present invention, is shown. In the depicted example, the guard release switch 112 comprises an actuator component 128 a spring-like member 116 and a connector post 118. In the illustrated embodiment, the top of the actuator component 128 is grooved to improve grip between the guard release switch 112 and the thumb of a user. In the depicted example, the guard release switch 112 is configured to connect with the blade guard 103 and the blade guard 103 is configured to engage with the blade guard track 120 within the main body housing 101 in a manner that permits the blade guard 103 to be aligned to slide forward and backward within the main body housing 101. In the depicted example, the connector post 118 includes a post blocker component 117 and a post opening 119 configured to receive a portion of the inner blade guard component 105. In some examples, the spring-like member 116 of the guard release switch 112 is configured to compress and extend. In an exemplary usage scenario, the guard release switch 112 is pressed to compress the spring-like member 116 and permit the connector post 118 to move from a first position, wherein the blade guard 103 is "locked" and the guard column 111 of the blade guard 103 is blocked by the post blocker component 117, preventing blade guard 103 from moving upwards or retracting into the main body housing 101, to a second position, wherein the guard column 111 of the blade guard 103 is aligned with and configured to pass through the post opening 119, "unlocking" the blade guard 103 and permitting the blade guard 103 to retract or move further into the main body housing 101. When the guard release switch 112 is released, the spring-like member 116 is configured to bias the connector post 118 to extend back to the first position.

As shown in FIGS. 4-5, the main body housing 101, which substantially contains the other components, comprises a front-half body shell 106 and a rear-half body shell 108 which are joined to each other through a combination of the front housing engagement means 130, and rear housing engagement means 132. In the depicted example, the blade carrier 138 is configured to receive the blade 102. In the illustrated example, the blade channel 134 within the blade guard 103 is configured to slidably receive the blade carrier 138. In the depicted embodiment, the blade 102 is elongated and includes a first end portion and a second end portion. In some embodiments, the first end portion of the blade 102 may be selectively disposed nearest the blade opening 126. In some embodiments, the second end portion of the blade 102 may be selectively disposed nearest the blade opening 126.

Figure 7:
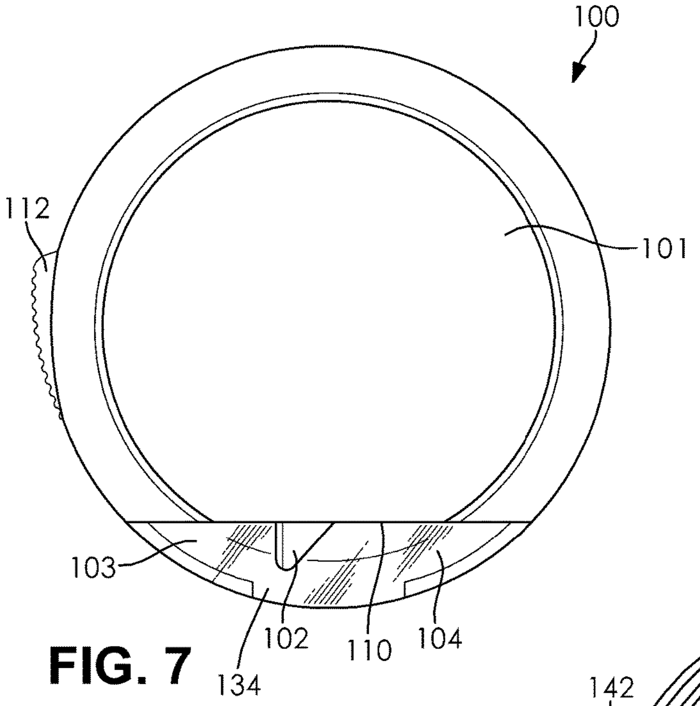
FIG. 7 shows a top view of a safety cutter with a transparent extended blade guard in accordance with an embodiment of the present invention.

Turning now to FIG. 7, a top view of a safety cutter with a transparent extended blade guard in accordance with an embodiment of the present invention, is shown. In the depicted example, the guard release switch 112 and the blade guard 103 are both in their respective extended positions. When the guard release switch 112 is extended, the blade guard 103 is "locked" or secured in its extended position, protruding from the blade guard outlet slot 110 to cover the blade 102. In the illustrated embodiment, the blade guard 103 is transparent, showing the general position of the blade 102 when the blade guard 103 is extended. In some embodiments, the blade 102 is configured to maintain its general position, whether the blade guard 103 is in its extended or retracted position.

Figure 8:
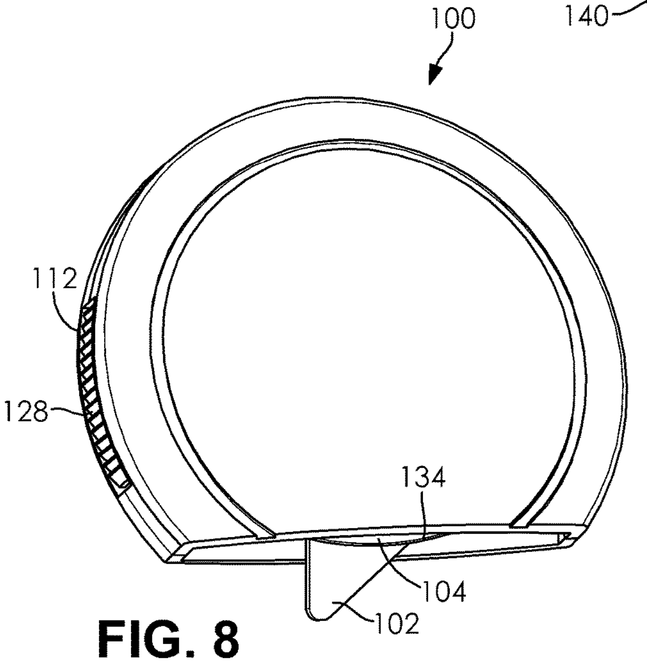
FIG. 8 shows a front perspective view of a safety cutter with a retracted blade guard and an exposed blade in accordance with an embodiment of the present invention.

Turning now to FIG. 8, a front perspective view of a safety cutter with a retracted blade guard and an exposed blade in accordance with an embodiment of the present invention, is shown. In the depicted example, the guard release switch 112 is compressed, and the blade guard 103 is retracted into the main body housing 101. In an exemplary usage scenario, a user will push down the actuator component 128 of the guard release switch 112 to "unlock" the blade guard 103 such that the blade guard 103 is permitted to move (but does not move) upwards into the main body housing 101. In some scenarios, pushing the guard release switch 112 will compress the spring-like member 116 (shown in FIG. 4), and push forward the guard connecter post 118 (shown in FIG. 4) to "unlock" the blade guard 103 and allow the outer blade guard component 104 to move inward, if the blade guard is acted upon by an external force greater than the spring force exerted by the tension component 122 (shown in FIG. 4). In some examples, when the blade guard 103 is acted upon by such external force, the outer blade guard component 104 is configured to retract into the main body housing 101 to expose the blade 102 disposed within the blade channel 134, as shown in FIG. 8.

Figure 9:
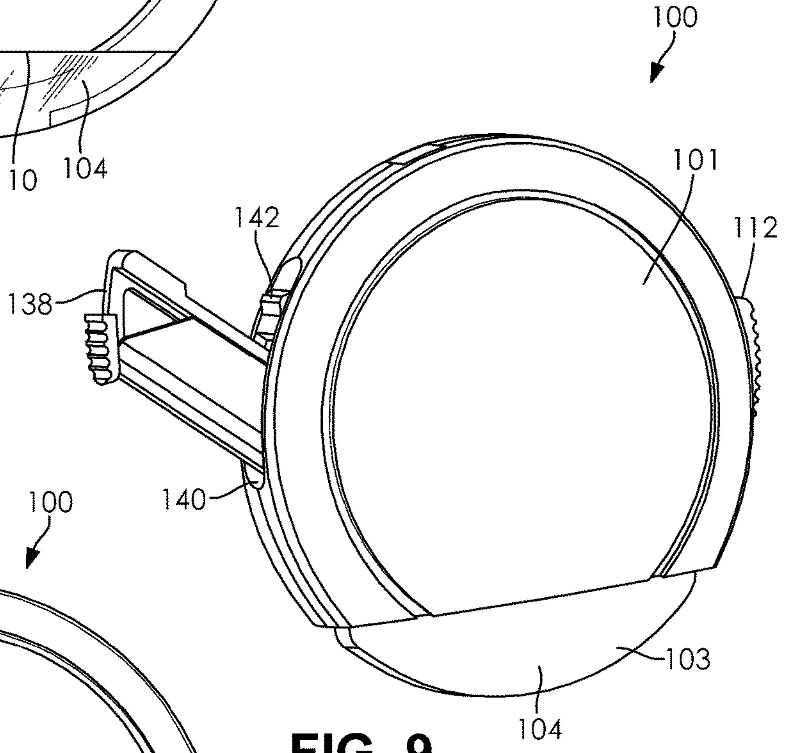
FIG. 9 shows a perspective view of a safety cutter with an ejected blade carrier in accordance with an embodiment of the present invention.

Turning now to FIG. 9, a perspective view of a safety cutter with an ejected blade carrier in accordance with an embodiment of the present invention, is shown. In the depicted example, the edge of the main body housing 101 includes a drawer opening 140 configured to receive the blade carrier 138. In some embodiments, the blade carrier 138 is configured as a drawer which is adapted to slide along a blade track in the blade channel 134 (as shown in FIG. 4) of the blade guard 103. As shown in FIGS. 4,5 and 9, exterior to the drawer opening 140, along the edge of the main body housing 101, may be disposed a blade carrier lock 142 comprising a lock nob 146 and a lock spring 144. In the depicted example, the blade carrier lock 142 is configured to lock the blade carrier 138 within the main body housing 101. In the illustrated examples, the lock nob 146 is configured to slide between a first and second position. In some embodiments, the first position is the position in which the lock nob 146 substantially covers a top portion of the blade carrier 138 and the second position is the position in which the lock nob 146 is removed from atop the blade carrier 138, to permit the removal of the blade carrier 138 from within the main body housing 101. Consequently, the drawer opening 140 is configured to be in a "closed" or "locked" position when the lock nob 146 is in the first position and in an "open" or "unlocked" position when the lock nob 146 is in the second position. In some embodiments, the lock spring 144 is disposed along the track of the blade carrier 138. In some embodiments, the lock spring 144 is configured to push at least a portion of the blade carrier 138 out of the main body housing when the lock spring 144 is activated.

In accordance with an exemplary embodiment of the present invention, a first blade may be replaced with a second blade by unlocking the blade carrier lock 142, ejecting the blade carrier 138 from within the main body housing 101, disengaging the first blade from the blade carrier 138 and engaging the second blade with the blade carrier 138.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In an exemplary usage scenario, a user will hold the round safety cutter with, in some cases, the user's index finger on the actuator component and push down, to compress the spring-like member of the guard release switch. In some examples, this action will move the connector post such that the post opening aligns with the guard column of the blade guard, to permit the guard column to pass through the connector post, thereby permitting the blade guard to retract upwards into the main body housing. Thus, if the user applies a force greater than the spring force applied by the tension component to the blade guard, the blade guard may retract, now that the connecter post is not preventing its progression into the main body housing. With the blade guard in the retracted position, the blade becomes exposed and protrudes through the blade opening of the blade guard and the user may use the compact cutter to cut the user's selected materials, for example, a carton. When the extension force applied by the tension component is greater than the outside force applied to the blade guard, the blade guard is configured to extend. Once the user releases the guard release switch, the connector post moves back to block the path of the guard column and re-lock the blade guard in its extended position, wherein the blade guard covers the blade.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A cutting device, comprising:

a housing configured to retain a blade; and a movable blade guard at least partially disposed within the housing and having an outer edge formed with an opening extending inward toward a blade channel of the movable blade guard, wherein the movable blade guard moves into the housing to allow the blade to pass through the opening to selectively uncover at least a portion of a cutting edge of the blade; and a guard release switch comprising a connector post component and a release switch tension component, wherein the connector post component is a flange extending from the guard release switch that is configured to selectively engage with a portion of the movable blade guard and the release switch tension component biases the guard release switch to a first position.

2. The cutting device of claim 1, wherein the blade channel is substantially hollow.

3. The cutting device of claim 1, wherein the outer edge is configured to slide into the housing to allow the blade to pass through the opening to selectively uncover the portion of the cutting edge of the blade.

4. The cutting device of claim 1, wherein at least the portion of the cutting edge of the blade passes through the opening of the movable blade guard when the movable blade guard is moved to a retracted blade guard position.

5. The cutting device of claim 1, further comprising a blade guard tension component operably connected to the movable blade guard for biasing the movable blade guard to cover the blade.

6. The cutting device of claim 1, further comprising a blade carrier configured to hold the blade inside the housing and be removable from the housing to replace the blade, wherein the blade carrier aligns the blade with the opening of the movable blade guard when the blade carrier is inserted into the housing.

7. The cutting device of claim 6, further comprising a blade carrier lock and a lock spring, wherein the lock spring is arranged to push the blade carrier out of the housing when the blade carrier lock is in an unlocked position.

8. A cutting device, comprising:

a housing configured to retain a blade;

a movable blade guard at least partially disposed within the housing and having an opening extending inward toward a blade channel of the movable blade guard, the movable blade guard movable into the housing thereby allowing the blade to pass through the opening to selectively uncover at least a portion of a cutting edge of the blade a guard release switch movable between a first position and a second position, wherein the guard release switch is biased toward the first position by a release switch tension component attached to the guard release switch and the first position is characterized by the guard release switch being in a blocking position relative to the moveable blade guard; and a tension component operably connected to the movable blade guard for biasing the movable blade guard outward from the housing.

9. The cutting device of claim 8, wherein at least the portion of the cutting edge of the blade passes through the opening of the movable blade guard when the movable blade guard is moved to a retracted position.

10. The cutting device of claim 8, wherein the blade is disposed in a blade drawer configured to hold the blade in a fixed position relative to the housing.

11. The cutting device of claim 10, wherein the opening passes over at least a portion of the blade drawer and the blade when the movable blade guard moves.

12. The cutting device of claim 8, wherein the tension component is configured to bias the movable blade guard outward from the housing such that the blade channel slides over and covers at least the portion of the cutting edge of the blade.

13. The cutting device of claim 8, wherein the tension component is configured to compress and allow the movable blade guard to move into the housing to uncover the blade when an external force opposed to and greater than a spring force that is applied by the tension component to the movable blade guard.

14. The cutting device of claim 13, wherein the spring force directs the movable blade guard to automatically extend when the external force is removed.

15. The cutting device of claim 8, wherein the first position is further characterized by a connector post of the guard release switch blocking the movement of the movable blade guard and the second position is characterized by the connector post being moved so that a receiving hole formed in the connector post permits retractive movement of the movable blade guard into the housing.

16. A cutting device, comprising:

a housing configured to retain a blade;

a blade guard having an opening and a blade guard column formed on a lateral edge of the blade guard, the blade guard movable into the housing to allow the blade to pass through the opening to selectively uncover at least a portion of a cutting edge the blade; and a blade guard switch having a movable post component formed with a column receiving hole configured to selectively receive the blade guard column to enable movement of the blade guard.

17. The cutting device of claim 16, wherein a portion of the movable post component is configured to block movement of the blade guard until the blade guard switch is moved to align the column receiving hole of the movable post component with the blade guard column of the blade guard.

18. The cutting device of claim 16, wherein the blade guard switch is configured to toggle between a first switch position, wherein a blocker portion of the movable post component prevents the blade guard from retracting, and a second switch position, wherein the column receiving hole of the movable post component is moved to receive the blade guard column and permit the blade guard to retract into the housing to uncover the portion of the cutting edge of the blade.

19. The cutting device of claim 18, wherein in the first switch position, the movable post component locks the blade guard in an extended position, and in the second switch position, the column receiving hole receives the blade guard column of the blade guard to unlock the blade guard and permit the blade guard to retract into the housing.

20. The cutting device of claim 18, wherein in the first switch position, the blocker portion of the movable post component abuts a portion of the blade guard column to block the path of the blade guard column and prevent the blade guard from retracting into the housing, and wherein in the second switch position, the movable post component and the column receiving hole are moved to permit the blade guard column to travel through the column receiving hole in the movable post component, thereby unlocking the blade guard and permitting the blade guard to retract into the housing to at least partially uncover the blade.

* * * * *